United States Patent
Sun

(10) Patent No.: US 8,412,924 B2
(45) Date of Patent: Apr. 2, 2013

(54) OFFLINE SETUP RECORDING DEVICE AND METHOD AND ELECTRONIC APPARATUS USING THE SAME

(75) Inventor: Chun-I Sun, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 107 days.

(21) Appl. No.: 13/176,089

(22) Filed: Jul. 5, 2011

(65) Prior Publication Data

US 2012/0166830 A1    Jun. 28, 2012

(30) Foreign Application Priority Data

Dec. 22, 2010   (TW) ............................. 99145302 A

(51) Int. Cl.
*G06F 1/24* (2006.01)

(52) U.S. Cl. ........................................ 713/100; 710/10

(58) Field of Classification Search ............... 710/10; 713/100
See application file for complete search history.

(56) References Cited

U.S. PATENT DOCUMENTS

| 2010/0073187 A1* | 3/2010 | Clayton et al. | 340/825.22 |
| 2012/0235715 A1* | 9/2012 | Lee | 327/142 |

\* cited by examiner

*Primary Examiner* — Albert Wang
(74) *Attorney, Agent, or Firm* — Rosenberg, Klein & Lee

(57) ABSTRACT

An offline setup recording device used in an electronic apparatus is illustrated. When the electronic apparatus is power on, the total energy storage unit is charged by a power supply through the unidirectional conduction unit, such that a total voltage is stored therein. When the electronic apparatus is power off, a user operates the automatically recovering switch to be conducted, such that the state energy storage unit is charged by the total energy storage through the automatically recovering switch, and a storage voltage signal is stored therein. When the electronic apparatus is power on again, the reading unit receives the power, reads out the storage voltage signal, and outputs a read voltage signal accordingly.

21 Claims, 8 Drawing Sheets

OFFLINE SETUP RECORDING DEVICE AND METHOD AND ELECTRONIC APPARATUS USING THE SAME

BACKGROUND

1. Technical Field

The present disclosure relates to a setup recording device, in particular, to an offline setup recording device, a method thereof, and an electronic apparatus using the same, wherein the offline setup recording device is capable of recording the setup when the electronic apparatus is power off.

2. Description of Related Art

Generally, most of electronic apparatuses allow the user configures the setup of the electronic apparatus, and the electronic apparatus is capable of recording the setup in the setup recording device. Accordingly, when the electronic apparatus is online (power on) again after the electronic apparatus is offline (i.e. power off), the electronic apparatus executes the new following setup work according to the recorded setup.

Some electronic apparatus has the non-volatile memories. Accordingly, when the electronic apparatus is online, the user configures the setup of the electronic apparatus, and the setup is recorded in the non-volatile memory. However, the user is able to configure the setup of the electronic apparatus only when the electronic apparatus is online. In other words, the battery or the power supply must be provided for the electronic apparatus having the non-volatile memory, such that the user is able to configure the setup of the electronic apparatus.

In addition, some electronic apparatus is provided, such that the user is able to configure the setup of the electronic apparatus when the electronic apparatus is offline. The electronic apparatus, such as the hard disk, compact disc reader, motherboard, ZigBee control lamp, and so on has a jumper or a dip switch, such that the user can operate the jumper or the dip switch to configure the setup of the electronic apparatus. The user can configure the setup of the electronic apparatus having the jumper or the dip switch when the electronic apparatus is offline, but the jumper and the dip switch must be adjusted to the initial state by the user if the user wants the electronic apparatus to have the initial setup.

The ZigBee control lamp is usually used to implement the lighting device of the electronic home, and the ZigBee control lamp served as the coordinator configures the network address and the parameters of the other one ZigBee control lamp served as the client.

The user must crawl on the ladder to take apart the ZigBee control lamp of the ceiling, and operate the dip switch or the jumper to configure the setup of the ZigBee control lamp, such that the ZigBee control lamp can execute the new following setup work relative to the network address and the parameters according to the setup which is recorded when the ZigBee control lamp is offline. However, when the user wants recover the setup of the ZigBee control lamp of the ceiling to the initial setup, the user must crawl on the ladder to take apart the ZigBee control lamp served as the client again, and adjust the jumper and the dip switch to the initial state, such that the ZigBee control lamp served as the coordinator configures the setup of the other one ZigBee control lamp served as the client to the manufacturing or initial setup.

SUMMARY

An exemplary embodiment of the present disclosure provides an offline setup recording device used in an electronic apparatus. The offline setup recording device comprises a unidirectional conduction unit, a total energy storage unit, at least an automatically recovering switch, at least a state energy storage unit, and at least a reading unit. When a power supply supplies a power to the electronic apparatus, the total energy storage unit is charged by the power supply through the unidirectional conduction unit, such that a total voltage is stored in the total energy storage unit. The automatically recovering switch is conductive when the automatically recovering switch is operated by a user, and the automatically recovering switch is open when the automatically recovering switch is not operated by the user. When the power supply does not supply the power to the electronic apparatus, the user operates the automatically recovering switch to be conducted, such that the state energy storage unit is charged by the total energy storage unit through the automatically recovering switch, and a storage voltage signal is stored in the state energy storage unit. When the power supply provides the power to the electronic apparatus again, the reading unit receives the power, reads out the storage voltage signal, and outputs a read voltage signal accordingly.

An exemplary embodiment of the present disclosure provides an electronic apparatus. The electronic apparatus comprises the above offline setup recording device, a controller, and an electronic chip. The controller decodes the read voltage signal, so as to generate a state setup signal. The electronic chip checks whether a setup is present of an initial state according to the state setup signal. If the setup is present of the initial state, the electronic chip is not to be configured. If the setup is not present of the initial state, the electronic chip is to be configured according to the setup, so as to execute a new following setup work.

An exemplary embodiment of the present disclosure provides offline setup recording method, executed in an electronic apparatus with an offline setup recording device. When the electronic apparatus has a power supply to supply a power thereto, a total energy storage unit of the electronic apparatus is charged by the power supply through a unidirectional conduction unit of the electronic apparatus, such that a total voltage is stored in the total energy storage unit. When the power supply does not supply the power to the electronic apparatus, an automatically recovering switch of the electronic apparatus is operated to be conducted by a user. A state energy storage unit of the electronic apparatus is charged by the total energy storage unit through a conduction of the automatically recovering switch, such that a storage voltage signal is stored in the state energy storage unit, wherein the automatically recovering switch is conductive when the automatically recovering switch is operated by the user, and the automatically recovering switch is open when the automatically recovering switch is not operated by the user. When the power supply provides the power to the electronic apparatus again, a reading unit of the electronic apparatus receives the power, reads out the storage voltage signal, and outputs a read voltage signal accordingly.

To sum up, the offline setup recording device and the electronic apparatus thereof allow the user configuring the setup of the electronic apparatus when the electronic apparatus is offline.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided

DESCRIPTION OF THE EXEMPLARY EMBODIMENTS

Exemplary Embodiment of Electronic Apparatus

Figure 1:
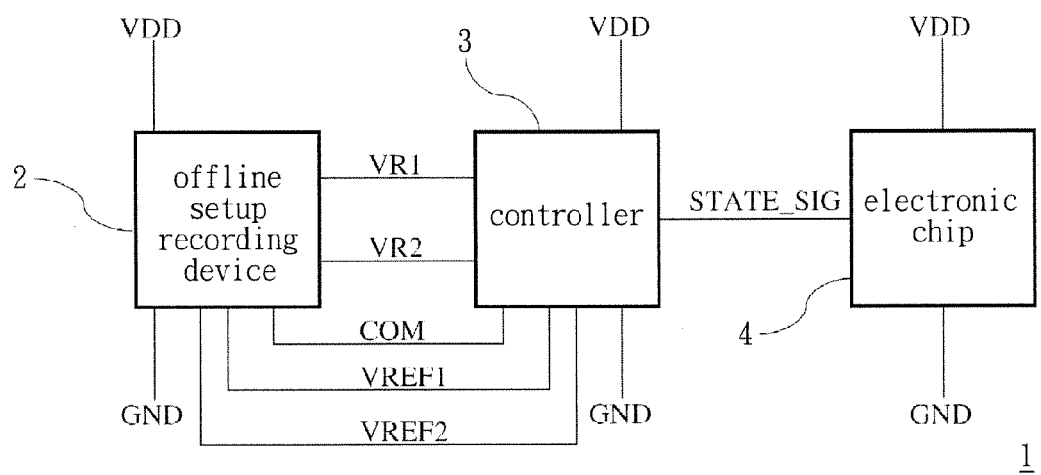
FIG. 1 is a block diagram of an electronic apparatus according to an exemplary embodiment of the present disclosure.

Referring to FIG. 1, FIG. 1 is a block diagram of an electronic apparatus according to an exemplary embodiment of the present disclosure. The electronic apparatus 1 comprises an offline setup recording device 2, a controller 3, and an electronic chip 4. The offline setup recording device 2, the controller 3, and the electronic chip 4 are all electrically coupled to a ground GND and a power supply VDD. The offline setup recording device 2 is electrically coupled to the controller 3, and the electronic chip 4 is also electrically coupled to the controller 3.

When the electronic apparatus 1 is offline (i.e. the electronic apparatus 1 is not connected to the power supply VDD, or the power supply stops to provide the power), the offline setup recording device 2 allows the user configuring the setup of the electronic apparatus 1, and stores the setup.

The difference between the offline setup recording device 2 and the conventional offline setup recording device implemented by the dip switch or the jumper is that the conventional offline setup recording device cannot be automatically reset to the initial state after the electronic apparatus read the setup, but the offline setup recording device 2 can be automatically reset to the initial state after the electronic apparatus 1 read the setup.

In other words, when the electronic apparatus 1 is online again (i.e. the power supply provides the power again), if the user wants the electronic apparatus 1 to be reset to the initial state, the user does not need to use the hand thereof to adjust the dip switch or the jumper. Furthermore, after the setup stored in the offline setup recording device 2 is readout, the setup is back to be present of the initial state.

The setup stored in the offline setup recording device 2 and configured by the user when the electronic apparatus 1 is offline may be represented by at least a storage voltage signal.

For example, in FIG. 1, the setup may be represented by the two storage voltage signals. When the electronic apparatus 1 is online again, the storage voltage signals used to represent the setup are read out, and the offline setup recording device 2 outputs the read voltage signals VR1 and VR2 to the controller 3.

It is noted that, the read voltage signals VR1 and VR2 may be the digital versions, the inverted digital versions, or the amplified analog versions of the two storage voltage signals, or the read voltage signals VR1 and VR2 may be two storage voltage signals used to represent the setup. Generally, to simplify the design complexity of the electronic circuit, the read voltage signals VR1 and VR2 may be the inverted digital versions of the two storage voltage signals.

The controller 3 receives and decodes the read voltage signals VR1 and VR2 to obtain the state setup signal STATE_SIG, wherein the state setup signal STATE_SIG is used to directly represent the setup. The electronic chip 4 receives the state setup signal STATE_SIG, and continues to be configured according to the state setup signal STATE_SIG representing the setup, so as to execute a new following setup work. To put it concretely, the state setup signal STATE_SIG is used to represent whether the electronic apparatus 1 is configured when the electronic apparatus 1 is offline, and used to represent the setup configured when the electronic apparatus 1 is offline.

For example, when the read voltage signals VR1 and VR2 are both 5 volts, the state setup signal STATE_SIG is 0 and represents that the user does not configure the setup of the electronic apparatus 1 when the electronic apparatus 1 is offline, i.e. the setup stored in the offline setup recording device 2 is present of the initial state. Accordingly, the electronic apparatus 1 is not to be configured and maintained without any change. For example, if the read voltage signals VR1 and VR2 are respectively 5 volts and 0 volt, the state setup signal STATE_SIG is 1 and represents that the user configures the setup of the electronic apparatus 1 when the electronic apparatus 1 is offline, i.e. the setup stored in the offline setup recording device 2 is not present of the initial state. Accordingly, the electronic apparatus 1 is to be configured according to the setup which the state setup signal STATE_SIG is 1, so as to execute a new following setup work.

In addition, after the read time is reached (i.e. the read voltage signals VR1 and VR2 are obtained), the controller 3 outputs the discharge control signal COM to discharge the two storage voltage signals stored in the offline setup recording device 2. Generally, the controller 3 controls the offline setup recording device 2 discharges the two storage voltage signals, such that the two storage voltage signals are substantially reduced to the ground GND. However, in some special cases, the controller 3 further provides two reference voltages VREF1 and VREF2 to the offline setup recording device 2, such that the two storage voltage signals are substantially reduced to the reference voltages VREF1 and VREF2 respectively. To put it concretely, the discharging devices 206 and 210 are usually implemented by the NPN transistors, the PNP transistors or the Metal-Oxide-Semiconductor Field-Effect Transistors (MOSFETs), such that the storage voltage signals are reduced to VREF1+$V_{CE}$ (or VREF1+$V_{DS}$) and VREF2+$V_{CE}$ (or VREF2+$V_{DS}$) respectively.

Though the exemplary example of FIG. 1 has two read voltage signals VR1 and VR2, the present disclosure is not limited thereto. The number of the read voltage signal is not used to limit the present disclosure. In addition, the controller 3 may not discharge the two storage voltage signals in the offline setup recording device 2, and may not provide the reference voltages VREF1 and VREF2 to the offline setup recording device 2, either. Moreover the electronic apparatus 1 in FIG. 1 may be the ZigBee control lamp, hard disk, compact disc reader, or motherboard, and the electronic chip 4 may correspondingly be the ZigBee light emitting diode chip, hard disk chip, compact disc reader chip, or motherboard chip.

Exemplary Embodiment of Offline Setup Recording Device

Figure 2:
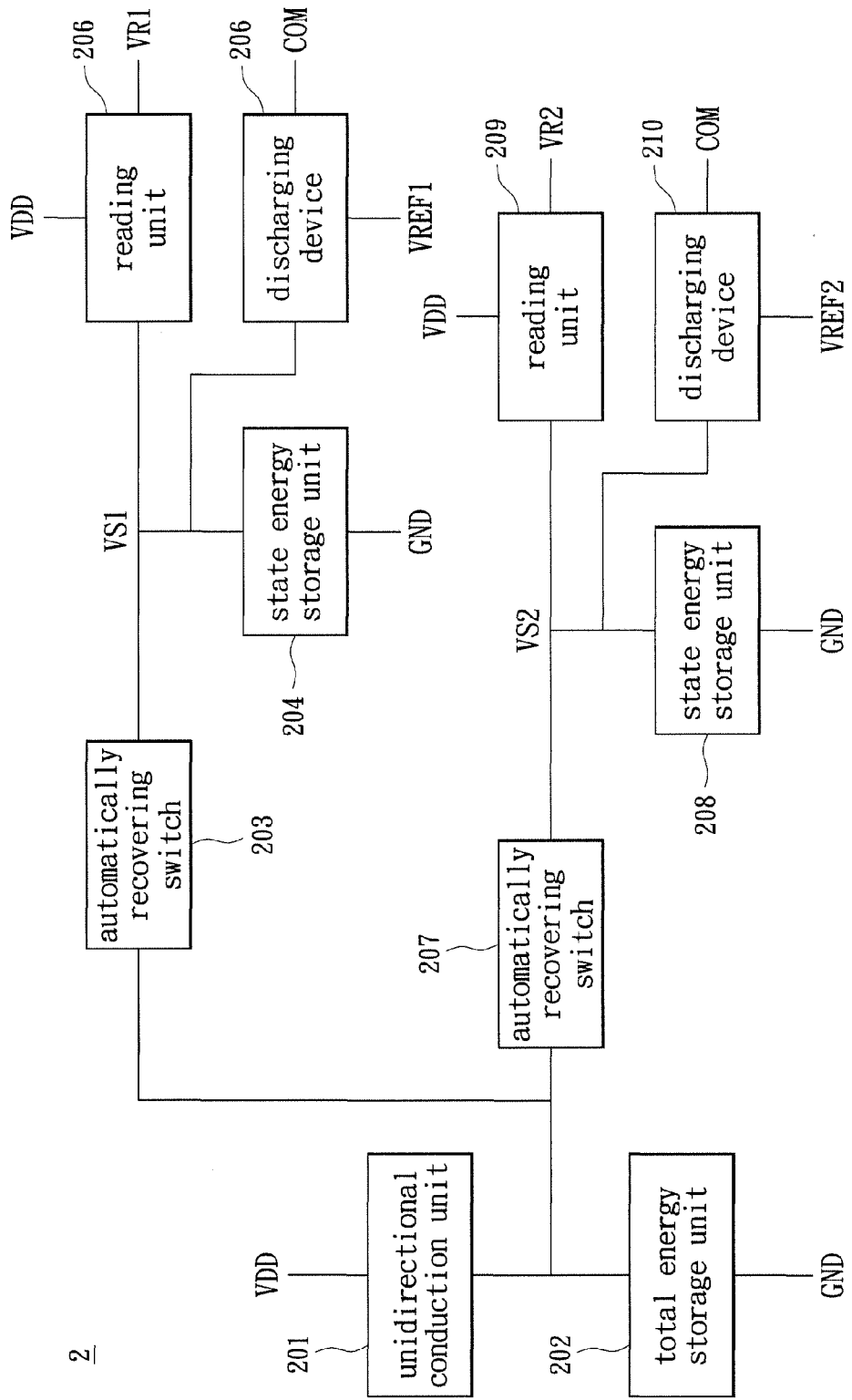
FIG. 2 is a block diagram of an offline setup recording device according to an exemplary embodiment of the present disclosure.

Referring to FIG. 2, FIG. 2 is a block diagram of an offline setup recording device according to an exemplary embodiment of the present disclosure. The offline setup recording device 2 comprises a unidirectional conduction unit 201, a total energy storage unit 202, at least an automatically recovering switch 203, 207, at least a state energy storage unit 204, 208, at least a reading unit 205, 209, and at least a discharging device 206, 210.

A first end of the unidirectional conduction unit 201 is electrically coupled to the power supply VDD, and a second end of the unidirectional conduction unit 201 is electrically coupled to a first end of the total energy storage unit 202. The first end of the total energy storage unit 202 is electrically coupled to first ends of the automatically recovering switches 203 and 207, and a second end of the total energy storage unit 202 is electrically coupled to the ground GND. Second ends of the automatically recovering switches 203 and 207 are electrically coupled to first ends of the state energy storage units 204 and 208 respectively. The first end of the state energy storage unit 204 is electrically coupled to first ends of the reading unit 205 and the discharging device 206, the first end of the state energy storage unit 208 is electrically coupled to first ends of the reading unit 209 and the discharging device 210, and second ends of the state energy storage units 204 and 208 are electrically coupled to the ground GND. Second ends of the reading units 205 and 209 output the read voltage signals VR1 and VR2 respectively, and third ends of the reading units 205 and 209 are electrically coupled to the power supply VDD. Control ends of the discharging devices 206 and 210 receive the discharge control signal COM, and second ends of the discharging devices 206 and 210 receive the reference voltages VREF1 and VREF2 respectively.

It is noted that though the exemplary embodiment of FIG. 2 has two automatically recovering switches 203, 207, two state energy storage units 204, 208, two reading units 205, 209, and two discharging devices 206, 210, the present disclosure is not limited thereto. In other words, the offline setup recording device 2 may merely have one automatically recovering switch 203, one reading unit 205, one state energy storage unit 204, and one discharging device 206, or the offline setup recording device 2 may have at least three automatically recovering switches, at least three state energy storage units, at least three reading units, and at least three discharging devices.

The unidirectional conduction unit 201 is conductive when the electronic apparatus 1 is online, and thus when electronic apparatus 1 is online, the power supply VDD charges the total energy storage unit 202. When the electronic apparatus 1 is offline, due to the unidirectional conduction of the unidirectional conduction unit 201, the total voltage stored in the total energy storage unit 202 is disable to discharge via the unidirectional conduction unit 201, such that the total voltage can be stored temporally. When the total energy storage unit 202 is implemented by the ceramics capacitor, the total voltage may be stored for two days.

The first and second ends of automatically recovering switch 203 (or 207) are conductive if the user touches, presses, or pulls the automatically recovering switch 203 (or 207) when the electronic apparatus 1 is offline. After the automatically recovering switch 203 (or 207) is touched, pressed, or pulled by the user (i.e. the automatically recovering switch 203 is not touched, pressed, or pulled now), the first and second ends of automatically recovering switch 203 (or 207) are back to open. In other words, the automatically recovering switch 203 (or 207) is conductive merely when being touched, pressed, or pulled by the user, and then is automatically back to open. Thus the automatically recovering switch 203 (or 207) may be a button switch, sensitive switch, touching switch, or sliding switch.

When the first and second ends of automatically recovering switch 203 are conductive, the total energy storage unit 202 charges the state energy storage unit 204, and thus the state energy storage unit stores the storage voltage signal VS1. In the similar manner, when the first and second ends of the automatically recovering switch 207 are conductive, the total energy storage unit 202 charges the state energy storage unit 208, and thus the state energy storage unit 208 stores the storage voltage signal VS2.

When the electronic apparatus 1 is online again, the reading units 205 and 209 read out the storage voltage signals VS1 and VS2 respectively, so as to output the read voltage signals VR1 and VR2. Each of the reading units 205 and 209 may comprise at least one of an amplifier, a buffer, and an analog-to-digital converter with at least bit. It is noted that the reading units 205 and 209 cannot read out the storage voltage signals VS1 and VS2 when the electronic apparatus 1 is offline, such that the state energy storage units 204 and 208 can temporally store the storage voltage signals VS1 and VS2 respectively. The state energy storage units 204 and 208 are implemented by the ceramics capacitors, the storage voltage signals VS1 and VS2 may be stored for two days.

The discharging devices 206 and 210 are controlled by the discharge control signal COM. When the read time is reached (i.e. the read voltage signals VR1 and VR2 are obtained), the controller 3 controls the discharging devices 206 and 210 provide the discharging path, such that the storage voltage signals VS1 and VS2 respectively stored in the state energy storage units 204 and 208 are discharged, and the storage voltage signals VS1 and VS2 are reduced to the reference voltages VREF1 and VREF2 respectively. As mentioned above, the controller 3 may not provide the reference voltages VREF1 and VREF2, and the second ends of the discharging devices 206 and 210 may be electrically coupled to the ground GND directly.

Exemplary Embodiment of Controller

Figure 3:
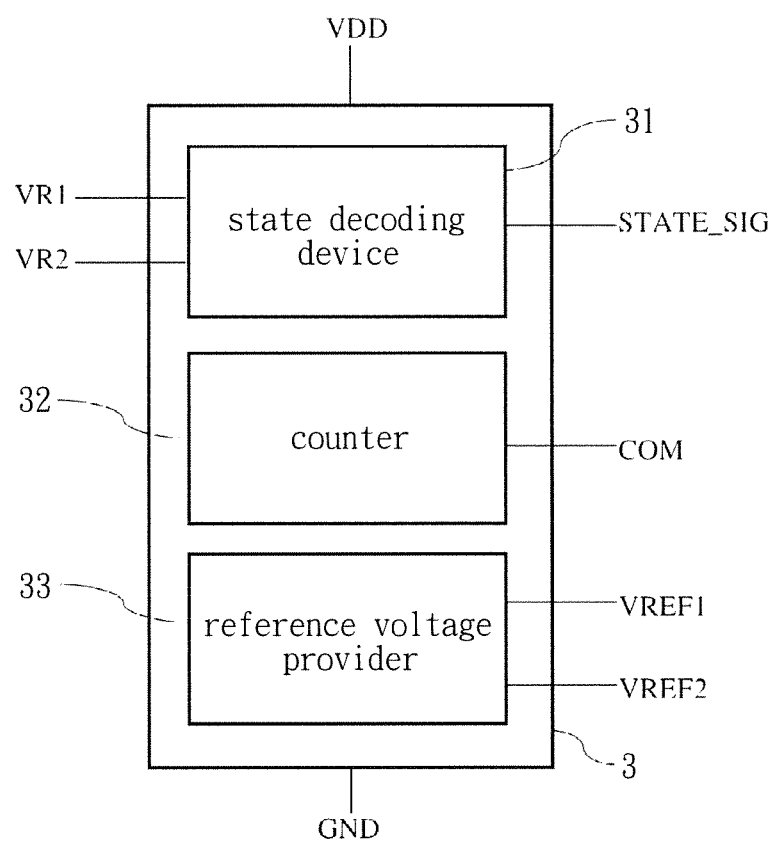
FIG. 3 is a block diagram of a controller according to an exemplary embodiment of the present disclosure.

Referring to FIG. 3, FIG. 3 is a block diagram of a controller according to an exemplary embodiment of the present disclosure. The controller 3 may be the independent chip not included in the electronic chip 4 of the electronic apparatus 1, or may be integrated and included in the electronic chip 4. The controller 3 comprises a state decoding device 31, a counter 32, and a reference voltage provider 33. The controller 3 starts to operate when the electronic apparatus is online. It is noted that the controller 3 in FIG. 3 is merely an exemplary embodiment of the present disclosure, and the present disclosure is not limited thereto.

The state decoding device 31 receives and decodes the read voltage signals VR1 and VR2 to generate the state setup signal STATE_SIG. The counter 32 starts to count when the electronic apparatus 1 is online. When the read time counted by the counter 32 is reached, the counter 32 outputs the discharge control signal COM. The reference voltage provider 33 receives the power from the power supply VDD, and provides the reference voltages VREF1 and VREF2.

Exemplary Embodiment of Detailed Circuit of Offline Setup Recording Device

Figure 4A:
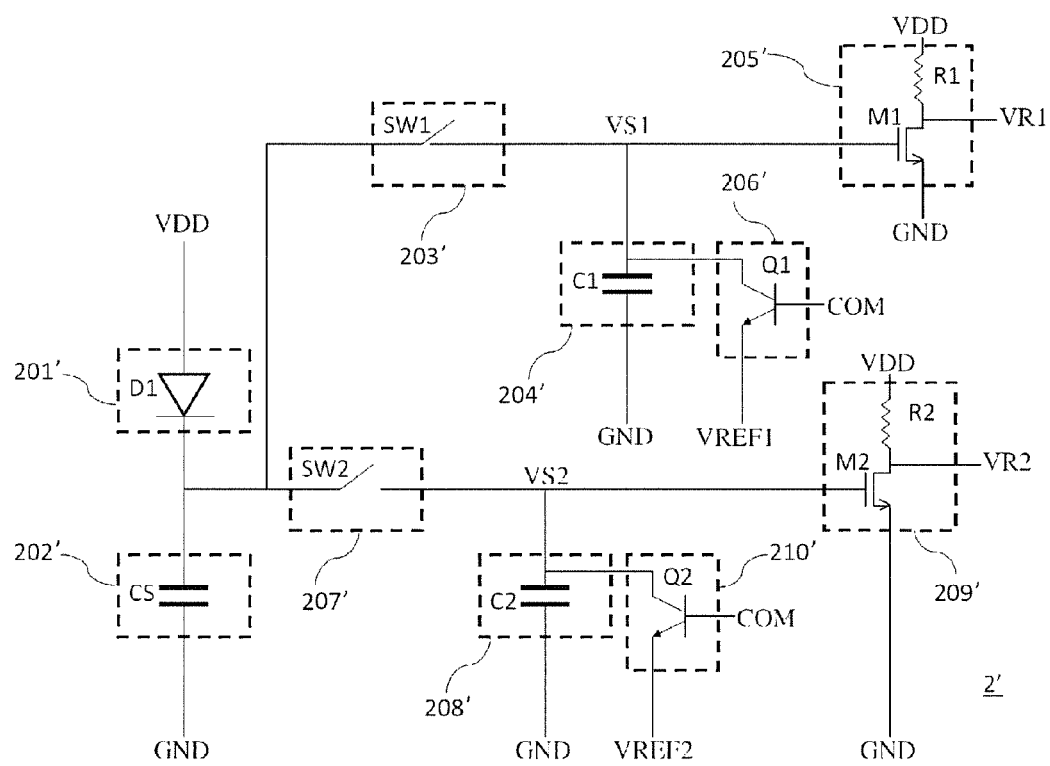
FIG. 4A is a detailed circuit diagram of an offline setup recording device according to an exemplary embodiment of the present disclosure.

Referring to FIG. 4A, FIG. 4A is a detailed circuit diagram of an offline setup recording device according to an exemplary embodiment of the present disclosure. The offline setup recording device 2' in FIG. 4A is one implementation of the offline setup recording device 2, and it is noted that the present disclosure is not limited thereto.

In FIG. 4A, the unidirectional conduction unit 201' is implement by a diode D1, wherein the kind of the diode D1 is not limited, and the diode D1 may be the PN diode or Shockley diode for example. The total energy storage unit 202' is implemented by a capacitor CS, and the state energy storage units 204' and 208' are implemented by the capacitors C1 and C2 respectively, wherein the kind of the capacitors CS, C1, and C2 is not limited, and the capacitors CS, C1, and C2 may be the electrolysis capacitors, ceramics capacitors, or the semiconductor capacitors. However, the capacitor having the long storage time is preferred. The automatically recovering switches 203' and 207' are implemented by the touching switches SW1 and SW2, wherein the kind and manufacturer of the touching switches SW1 and SW2 are not limited.

The discharging devices 206' and 210' are implemented by the NPN transistors Q1 and Q2 respectively, wherein the bases of the NPN transistors Q1 and Q2 receive the discharge control signal COM, the collectors of the NPN transistors Q1 and Q2 are electrically coupled to the capacitors C1 and C2 respectively, and the emitters of the NPN transistors Q1 and Q2 receives the reference voltages VREF1 and VREF2 respectively. If the discharging devices 206' and 210' are implemented by the NPN transistors Q1 and Q2 respectively, the storage voltage signals VS1 and VS2 respectively stored in the capacitors C1 and C2 are reduced to VREF1+$V_{CE}$ and VREF2+$V_{CE}$ when the NPN transistors Q1 and Q2 are controlled to be turned on. Generally, the current voltage $V_{CE}$ between the collector and the emitter is the saturation voltage between the collector and the emitter, i.e. $V_{CE}$ is 0.2 volts.

The reading units 205' and 209' are implemented by the inverters, wherein the inverter of the reading unit 205' comprises a MOSFET M1 and a resistor R1, and the inverter of the reading unit 209' comprises a MOSFET M2 and a resistor R2. The gates of the MOSFETs M1 and M2 are electrically coupled to the capacitors C1 and C2 respectively, the drains of the MOSFETs M1 and M2 are electrically coupled to the resistors R1 and R2 respectively, and the sources of the MOSFETs M1 and M2 are electrically coupled to the ground GND. The drains of the MOSFETs M1 and M2 output the read voltage signals VR1 and VR2 respectively.

When the user touches the touching switch SW1, the storage voltage signal VS1 stored in the capacitor C1 is increased, and thus the reading unit 205' outputs the read voltage signal VR1 with the voltage being present of the logical 0. In the similar manner, when the user touches the touching switch SW2, the storage voltage signal VS2 stored in the capacitor C2 is increased, and thus the reading unit 210' outputs the read voltage signal VR2 with the voltage being present of the logical 0.

Figure 4B:
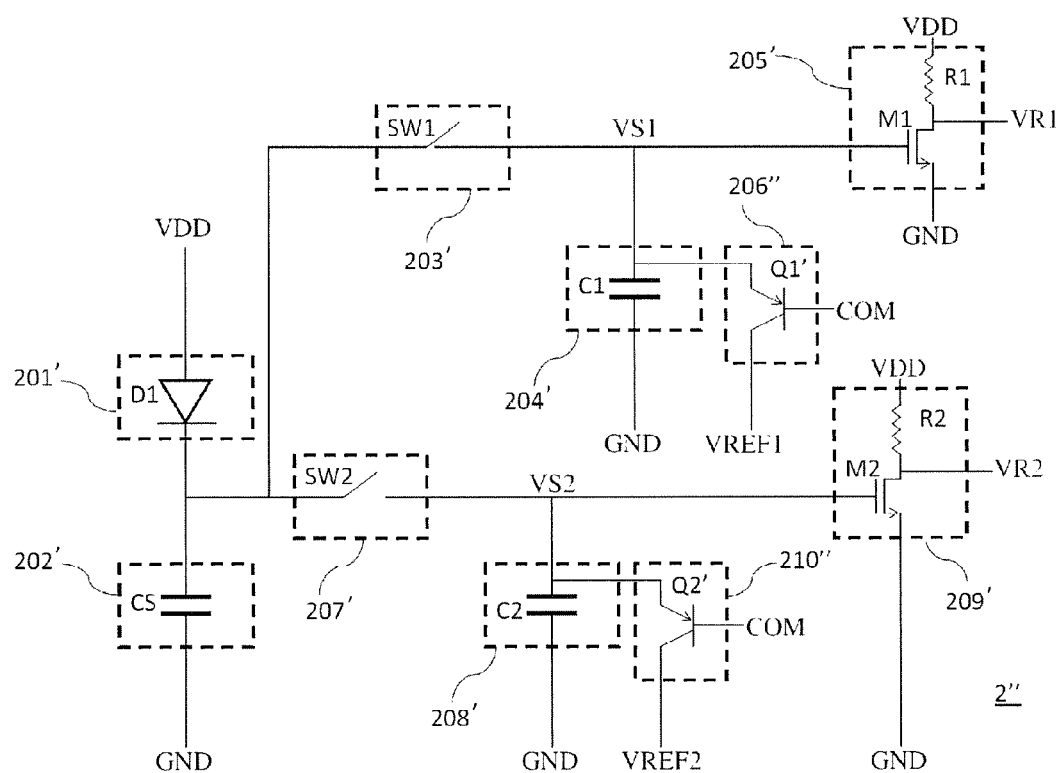
FIG. 4B is a detailed circuit diagram of an offline setup recording device according to another one exemplary embodiment of the present disclosure.

Another Exemplary Embodiment of Detailed Circuit of Offline Setup Recording Device Referring to FIG. 4B, FIG. 4B is a detailed circuit diagram of an offline setup recording device according to another one exemplary embodiment of the present disclosure. The difference between the offline setup recording device 2'' in FIG. 4B and the offline setup recording device 2' in FIG. 4A is that the discharging devices 206'' and 210'' is implemented by the PNP transistors Q1' and Q2'. The bases of PNP transistors Q1' and Q2' receive the discharge control signal COM, the emitter of the PNP transistors Q1' and Q2' are electrically coupled to the capacitors C1 and C2 respectively, and the collectors of the PNP transistors Q1' and Q2' receive the reference voltages VREF1 and VREF2 respectively.

It is noted that the discharge control signal COM generated by the controller in FIG. 4B is low, but the discharge control signal COM generated by the controller in FIG. 4A is high.

Figure 4C:
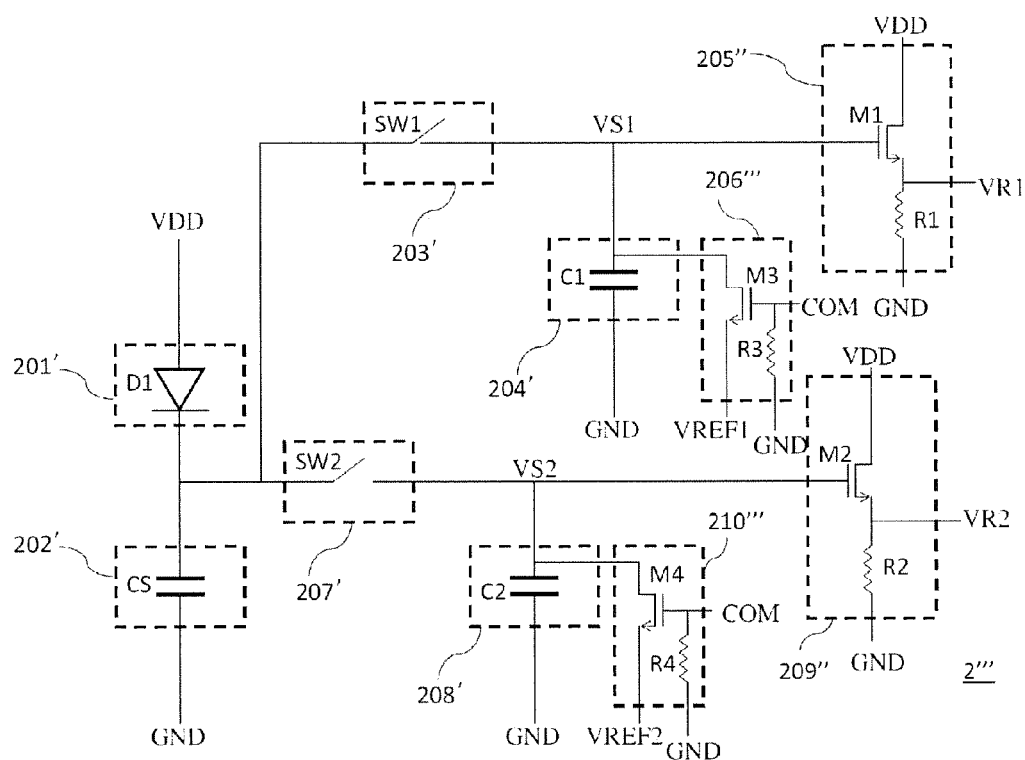
FIG. 4C is a detailed circuit diagram of an offline setup recording device according to another one exemplary embodiment of the present disclosure.

Another Exemplary Embodiment of Detailed Circuit of Offline Setup Recording Device Referring to FIG. 4C, FIG. 4C is a detailed circuit diagram of an offline setup recording device according to another one exemplary embodiment of the present disclosure. The difference between the offline setup recording device 2''' in FIG. 4C and the offline setup recording device 2' in FIG. 4A is that the discharging device 206''' is implemented by the MOSFET M3 and the resistor R3, and the discharging device 210''' is implemented by the MOSFET M4 and the resistor R4. The other difference between the offline setup recording device 2''' in FIG. 4C and the offline setup recording device 2' in FIG. 4A is that the reading units 205'' and 209'' are implemented by the buffers to replace the inverters.

In FIG. 4C, one end of the resistor R3 is electrically coupled to the gate of the MOSFET M3, and the other end is electrically coupled to the ground GND. The gate of the MOSFET M3 receives the discharge control signal COM, and is electrically coupled to one end of the resistor R3. The drain of the MOSFET M3 is electrically coupled to one end of the capacitor C1, and the source of the MOSFET M3 receives the reference voltage VREF1. One end of the resistor R4 is electrically coupled to the gate of the MOSFET M4, and the other end of the resistor R4 is electrically coupled to the ground GND. The gate of the MOSFET M4 receives the discharge control signal COM, and is electrically coupled to one end of the resistor R3. The drain of the MOSFET M4 is electrically coupled to one end of the capacitor C1, and the source of the MOSFET M4 receives the reference voltage VREF2.

In the exemplary embodiment, the storage voltage signals VS1 and VS2 respectively stored in the capacitors C1 and C2 are reduced to VREF1+$V_{DS}$ and VREF2+$V_{DS}$ respectively when the MOSFETs M3 and M4 are controlled to be turned on. Generally, the current voltage $V_{DS}$ between the drain and the source is the saturation voltage between the drain and the source.

The reading unit 205'' is a buffer, and comprises a MOSFET M1 and a resistor R1. The gate of the MOSFET M1 is electrically coupled to one end of the capacitor C1, the drain of the MOSFET M1 is electrically coupled to the power supply VDD, and the source of the MOSFET M1 is electrically coupled to one end of the resistor R1. The other end of the resistor R1 is electrically coupled to the ground GND, the voltage between the two ends of the resistor R1 is the read voltage signal VR1. In the similar manner, the reading unit 209'' is a buffer, and comprises a MOSFET M2 and a resistor R2. The gate of the MOSFET M1 is electrically coupled to one end of the capacitor C2, the drain of the MOSFET M1 is electrically coupled to the power supply VDD, and the source of the MOSFET M1 is electrically coupled to one end of the resistor R2. The other end of the resistor R2 is electrically coupled to the ground GND, and the voltage between the two ends of the resistor R2 is the read voltage signal VR2. The source of the MOSFETs M1 and M2 outputs the read voltage signals VR1 and VR2 respectively.

In the exemplary embodiment, when the user touches touching switch SW1, the storage voltage signal VS1 stored in the capacitor C1 is increased, and thus the reading unit 205" outputs the read voltage signal VR1 with the voltage being present of the logical 1. In the similar manner, when the user touches the touching switch SW2, the storage voltage signal VS2 stored in the capacitor C2 is increased, and thus the reading unit 210" outputs the read voltage signal VR2 with the voltage being present of the logical 1.

Figure 5:
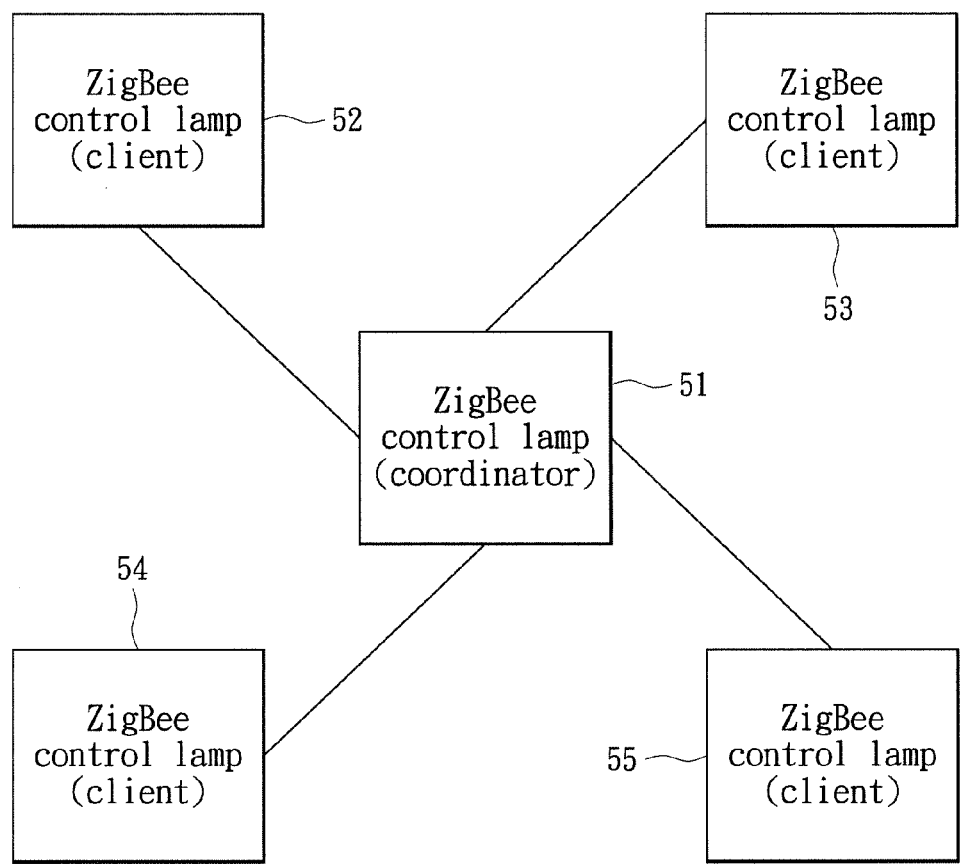
FIG. 5 is a schematic diagram of a ZigBee network system with a star topology according to an exemplary embodiment of the present disclosure.

Exemplary Embodiment of ZigBee Control Lamp Using Offline Setup Recording Device Referring to FIG. 5, FIG. 5 is a schematic diagram of a ZigBee network system with a star topology according to an exemplary embodiment of the present disclosure. The electronic apparatus having the offline setup recording device provided by the exemplary embodiment of the present disclosure can be the ZigBee control lamp, and the electronic chip of the electronic apparatus can correspondingly be the ZigBee control lamp chip. The ZigBee network system 5 with the star topology comprises a plurality of ZigBee control lamps 52~55 served as the clients and one ZigBee control lamp 51 served as the coordinator, wherein the ZigBee control lamp 51 served as the coordinator is linked to the ZigBee control lamps 52~55 served as the clients so as to form the ZigBee network system 5 with the star topology.

The ZigBee control lamp 51 (coordinator) may assign the network addresses and network parameters to the ZigBee control lamp 52~55 (clients). When the ZigBee control lamp 52 (client) breaks down, the user must replace the ZigBee control lamp 52 with a new ZigBee control lamp. The user configures the setup when the new ZigBee control lamp is offline, such that the new ZigBee control lamp executes the new following setup work when the new ZigBee control lamp is online. When the new ZigBee control lamp completes the new setup work, the setup recorded in the offline setup recording device can be automatically reset to be present of the initial state. Compared to the conventional ZigBee control lamp using the dip switch, when the ZigBee control lamp 51 (coordinator) wants to configure the new ZigBee control lamp again, the user does not need to crawl on the ladder to take apart the new ZigBee control lamp, and does not need to adjust the dip switch to make the setup be present of the initial state. Accordingly, the ZigBee control lamp using the offline setup recording device of the present disclosure may bring the convenience to the user.

Exemplary Embodiment of Offline Setup Recording Method

Figure 6:
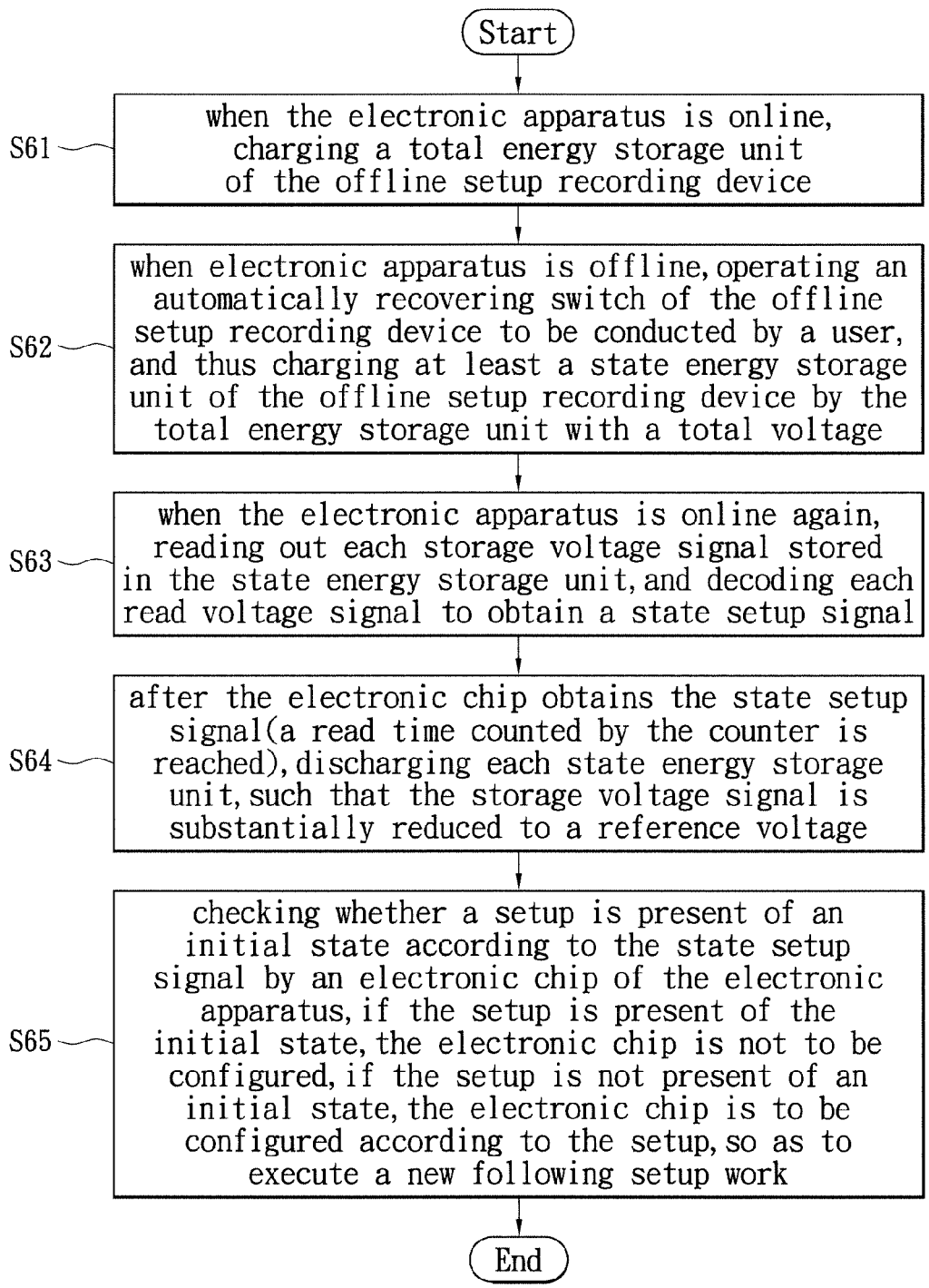
FIG. 6 is flow chart of an offline setup recording method according to an exemplary embodiment of the present disclosure.

Referring to FIG. 6, FIG. 6 is flow chart of an offline setup recording method according to an exemplary embodiment of the present disclosure. First, in step S61, when the electronic apparatus is online, the total energy storage unit of the offline setup recording device in the electronic apparatus is charged. Next, in step S62, when the electronic apparatus is offline, at least an automatically recovering switch of the offline setup recording device is operated by the user, such that at least a state energy storage unit of the offline setup recording device is charged by the total voltage stored in the total energy storage unit. In step S63, when the electronic apparatus is online again, each storage voltage signal stored in the state energy storage unit of the offline setup recording device is read out, and each read voltage signal is decoded to obtain the state setup signal.

Next, in step S64, after the electronic chip obtains the state setup signal (the read time counted by the counter is reached), each state energy storage unit is discharged, such that each state voltage signal each stored in state energy storage unit is reduced to the corresponding reference voltage. Finally, in step S65, the electronic chip whether the setup is present of an initial state according to the state setup signal. If the setup is present of the initial state, the electronic chip is not to be configured. If the setup is not present of the initial state, the electronic chip is to be configured according to the setup, so as to execute a new following setup work.

[Possible Result]

Accordingly, the offline setup recording device and the electronic apparatus provided by the exemplary embodiment of the present disclosure allows the user configure the setup when the electronic apparatus is offline. In addition, the offline setup recording device does not need the additional battery. Compared to the conventional offline setup recording device using the dip switch or the jumper, it is more convenient to the user for using the offline setup recording device provided by the exemplary embodiment of the present disclosure to configure the setup of the electronic apparatus.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An offline setup recording device, used in an electronic apparatus, comprising:
   a unidirectional conduction unit;
   a total energy storage unit, wherein when a power supply supplies a power to the electronic apparatus, the total energy storage unit is charged by the power supply through the unidirectional conduction unit, such that a total voltage is stored in the total energy storage unit;
   at least an automatically recovering switch, wherein the automatically recovering switch is conductive when the automatically recovering switch is operated by a user, and the automatically recovering switch is open when the automatically recovering switch is not operated by the user;
   at least a state energy storage unit, wherein when the power supply does not supply the power to the electronic apparatus, the user operates the automatically recovering switch to be conducted, such that the state energy storage unit is charged by the total energy storage unit through the automatically recovering switch, and a storage voltage signal is stored in the state energy storage unit; and
   at least a reading unit, wherein when the power supply provides the power to the electronic apparatus again, the reading unit receives the power, reads out the storage voltage signal, and outputs a read voltage signal accordingly.

2. The offline setup recording device according to claim 1, further comprising:
   at least a discharging device, controlled by a discharge control signal, wherein the state energy storage unit is discharged by the discharging device after the reading unit outputs the read voltage signal, such that the storage voltage signal is substantially reduced to a reference voltage.

3. The offline setup recording device according to claim 1, wherein the unidirectional conduction unit is a diode, the total energy storage unit is a first capacitor, the state energy storage unit is a second capacitor, and the reading unit comprises at least one of an inverter, a buffer, an amplifier, and an analog-to-digital converter.

4. The offline setup recording device according to claim 3, wherein the reading unit is the inverter and comprises:
   a resistor; and
   a MOSFET, a gate thereof is electrically coupled to the state energy storage unit, so as to receive the storage voltage signal, a drain thereof is electrically coupled to the resistor, so as to outputs the read voltage signal, and a source thereof is electrically coupled to a ground.

5. The offline setup recording device according to claim 3, wherein the reading unit is the buffer and comprises:
   a resistor; and
   a MOSFET, a gate thereof is electrically coupled to the state energy storage unit, so as to receive the storage voltage signal, a source thereof is electrically coupled a ground through the resistor, so as to output the read voltage signal, and a drain thereof is electrically coupled to the power supply.

6. The offline setup recording device according to claim 2, wherein the discharging device comprises:
   a NPN transistor, a base thereof is controlled by the discharge control signal, a collector thereof is electrically coupled to the state energy storage unit, and an emitter is electrically coupled to the reference voltage.

7. The offline setup recording device according to claim 2, wherein the discharging device comprises:
   a PNP transistor, a base thereof is controlled by the discharge control signal, an emitter thereof is electrically coupled to the state energy storage unit, and a collector thereof is electrically coupled to the reference voltage.

8. The offline setup recording device according to claim 2, wherein the reference voltage is a ground.

9. An electronic apparatus, comprising:
   an offline setup recording device, comprising:
      a unidirectional conduction unit;
      a total energy storage unit, wherein when a power supply supplies a power to the electronic apparatus, the total energy storage unit is charged by the power supply through the unidirectional conduction unit, such that a total voltage is stored in the total energy storage unit;
      at least an automatically recovering switch, wherein the automatically recovering switch is conductive when the automatically recovering switch is operated by a user, and the automatically recovering switch is open when the automatically recovering switch is not operated by the user;
      at least a state energy storage unit, wherein when the power supply does not supply the power to the electronic apparatus, the user operates the automatically recovering switch to be conducted, such that the state energy storage unit is charged by the total energy storage unit through the automatically recovering switch, and a storage voltage signal is stored in the state energy storage unit; and
      at least a reading unit, wherein when the power supply provides the power to the electronic apparatus again, the reading unit receives the power, reads out the storage voltage signal, and outputs a read voltage signal accordingly;
   a controller, used to decode the read voltage signal, so as to generate a state setup signal; and
   an electronic chip, used to check whether a setup is present of an initial state according to the state setup signal, if the setup is present of the initial state, the electronic chip is not to be configured, if the setup is not present of the initial state, the electronic chip is to be configured according to the setup, so as to execute a new following setup work.

10. The electronic apparatus according to claim 9, wherein the controller comprises a state decoding device used to decode the read voltage signal.

11. The electronic apparatus according to claim 10, wherein the controller further comprises a counter, the counter outputs a discharge control signal when a read time counted by the counter is reached; the offline setup recording device further comprises at least a discharging device, the discharging device is controlled by the discharge control signal, and the state energy storage unit is discharged by the discharging device after the read time is reached, such that the storage voltage signal is substantially reduced to a reference voltage.

12. The electronic apparatus according to claim 11, wherein the controller further comprises:
   a reference voltage provider, used to provide the reference voltage.

13. The electronic apparatus according to claim 11, wherein the unidirectional conduction unit is a diode, the total energy storage unit is a first capacitor, the state energy storage unit is a second capacitor, and the reading unit comprises at least one of an inverter, a buffer, an amplifier, and an analog-to-digital converter.

14. The electronic apparatus according to claim 13, wherein the reading unit is the inverter and comprises:
   a resistor; and
   a MOSFET, a gate thereof is electrically coupled to the state energy storage unit, so as to receive the storage voltage signal, a drain thereof is electrically coupled to the resistor, so as to outputs the read voltage signal, and a source thereof is electrically coupled to a ground.

15. The electronic apparatus according to claim 13, wherein the reading unit is the buffer and comprises:
   a resistor; and
   a MOSFET, a gate thereof is electrically coupled to the state energy storage unit, so as to receive the storage voltage signal, a source thereof is electrically coupled a ground through the resistor, so as to output the read voltage signal, and a drain thereof is electrically coupled to the power supply.

16. The electronic apparatus according to claim 13, wherein the discharging device comprises:
   a NPN transistor, a base thereof is controlled by the discharge control signal, a collector thereof is electrically coupled to the state energy storage unit, and an emitter is electrically coupled to the reference voltage.

17. The electronic apparatus according to claim 13, wherein the discharging device comprises:
   a PNP transistor, a base thereof is controlled by the discharge control signal, an emitter thereof is electrically coupled to the state energy storage unit, and a collector thereof is electrically coupled to the reference voltage.

18. The electronic apparatus according to claim 11, wherein the reference voltage is a ground.

19. An offline setup recording method, executed in an electronic apparatus with an offline setup recording device, comprising:

when the electronic apparatus has a power supply to supply a power thereto, charging a total energy storage unit of the offline setup recording device by the power supply through a unidirectional conduction unit of the offline setup recording device, such that a total voltage is stored in the total energy storage unit;

when the power supply does not supply the power to the electronic apparatus, operating an automatically recovering switch of the offline setup recording device to be conducted by a user;

charging a state energy storage unit of the offline setup recording device by the total energy storage unit through a conduction of the automatically recovering switch, such that a storage voltage signal is stored in the state energy storage unit, wherein the automatically recovering switch is conductive when the automatically recovering switch is operated by the user, and the automatically recovering switch is open when the automatically recovering switch is not operated by the user; and when the power supply provides the power to the electronic apparatus again, receiving the power, reading out the storage voltage signal, and outputting a read voltage signal accordingly by a reading unit of the offline setup recording device.

20. The offline setup recording method according to claim 19, further comprising:

after the reading unit outputs the read voltage signal, discharging the state energy storage unit according to a discharge control signal by a discharging device of the offline setup recording device, such that the storage voltage signal is substantially reduced to a reference voltage.

21. The offline setup recording method according to claim 20, further comprising:

decoding the read voltage signal by a controller of the electronic apparatus, so as to generate a state setup signal; and checking whether a setup is present of an initial state according to the state setup signal by an electronic chip of the electronic apparatus, if the setup is present of the initial state, the electronic chip is not to be configured, if the setup is not present of the initial state, the electronic chip is to be configured according to the setup, so as to execute a new following setup work.

* * * * *